United States Patent [19]

Clark

[11] Patent Number: 5,713,590
[45] Date of Patent: Feb. 3, 1998

[54] HAND PROPELLED VELOCIPEDE, QUADRICYCLE

[76] Inventor: Thomas S. Clark, 2341 NE. 20th St., Fort Lauderdale, Fla. 33305

[21] Appl. No.: 629,639

[22] Filed: Apr. 9, 1996

[51] Int. Cl.$^6$ ............................................. B62M 1/12
[52] U.S. Cl. ................................. 280/247; 280/248
[58] Field of Search ........................... 280/242.1, 244, 280/247, 248, 252, 267, 269, 234, 282

[56] References Cited

U.S. PATENT DOCUMENTS

| | | | |
|---|---|---|---|
| 230,242 | 7/1880 | McGann | 280/248 |
| 236,573 | 1/1881 | Giles | 280/247 |
| 1,479,887 | 1/1924 | Bitner . | |
| 2,928,682 | 3/1960 | Spencer . | |
| 4,639,007 | 1/1987 | Lawrence | 280/244 |
| 5,209,506 | 5/1993 | Klopfenstein . | |
| 5,280,936 | 1/1994 | Schmidlin | 280/244 |
| 5,492,349 | 2/1996 | Ferez | 280/248 |

*Primary Examiner*—Scott Cummings
*Attorney, Agent, or Firm*—Alvin S. Blum

[57] ABSTRACT

A vehicle has two steerable front wheels and two rear wheels that are driven by fore and aft motion of a handlebar atop a pivotted column assembly. Rotation of the handlebar steers the front wheels through a closed loop pretensioned push pull wire cable. The steering and propulsion actions are independent of one another. The column assembly translatory motion is converted to rotary motion of a sprocket by a crank mechanism. The sprocket drives a chain and derailer mechanism connected to the rear axle through an overrunning clutch for coasting forward free of the column assembly. An adjustable friction drag interposed between the rear axle and the chain drive provides enough yieldable connection between the column assembly and the rear wheels to overcome problems associated with dead center of the crank mechanism.

9 Claims, 5 Drawing Sheets

5,713,590

HAND PROPELLED VELOCIPEDE, QUADRICYCLE

TECHNICAL FIELD

This invention relates to vehicles, and more particularly, to a hand propelled and steered four wheel vehicle.

BACKGROUND OF THE INVENTION

Wheeled vehicles that are propelled by a lever and crank mechanism and front wheel steering are well known in the art as exemplified by U.S. Pat. No. 2,928,682 issued Mar. 15, 1960 to Spencer and U.S. Pat. No. 5,209,506 issued May 11, 1993 to Klopfenstein. Klopfenstein reviews the problems of the art and teaches a single rear wheel. This poses stability problems which are especially serious for a user who has lost use of the legs. He teaches a complex arcuate steering connection between the hand lever and the wheels so that back and forth driving action of the lever does not effect the steering.

Despite the need for a hand propelled vehicle and the great diversity of patents in the art, a stable, easily controlled and operated vehicle that can be propelled by reciprocating a lever and steered by the same lever has not successfully reached the marketplace.

SUMMARY OF THE INVENTION

It is, accordingly, an object of the invention to provide a hand propelled vehicle with four wheels for stability. It is another object that the vehicle be propelled by reciprocal for and aft motion of a pivotted lever. It is yet another object that the vehicle be steered by rotation of the lever about its long axis to turn the front wheels while eliminating interaction between propelling operation and steering operation. It is yet another object that the problems ordinarily encountered by crank and lever drives related to dead center conditions be overcome.

The velocipede of the invention comprises a vehicle with two rear wheels, one of which is driven through a chain drive linked to the hand lever by a lever and crank linkage; a pair of steerable front wheels that are steered by a closed loop connected to the lever such that rotation of the hand lever about its long axis steers the front wheels and reciprocation of the hand lever has effect on the steering.

The drive to the rear wheel is provided with an overrunning clutch so that when rolling downhill there will be no undersirable motion of the hand lever. The drive to the rear wheel is further provided with a drag clutch to impart a gentle force to the crank system to move past dead center.

These and other objects, advantages and features of the invention will become more apparent when the detailed description is studied in conjunction with the drawings in which like reference characters indicate like elements in the various figures.

DETAILED DESCRIPTION OF PREFERRED EMBODIMENT

Figure 1:
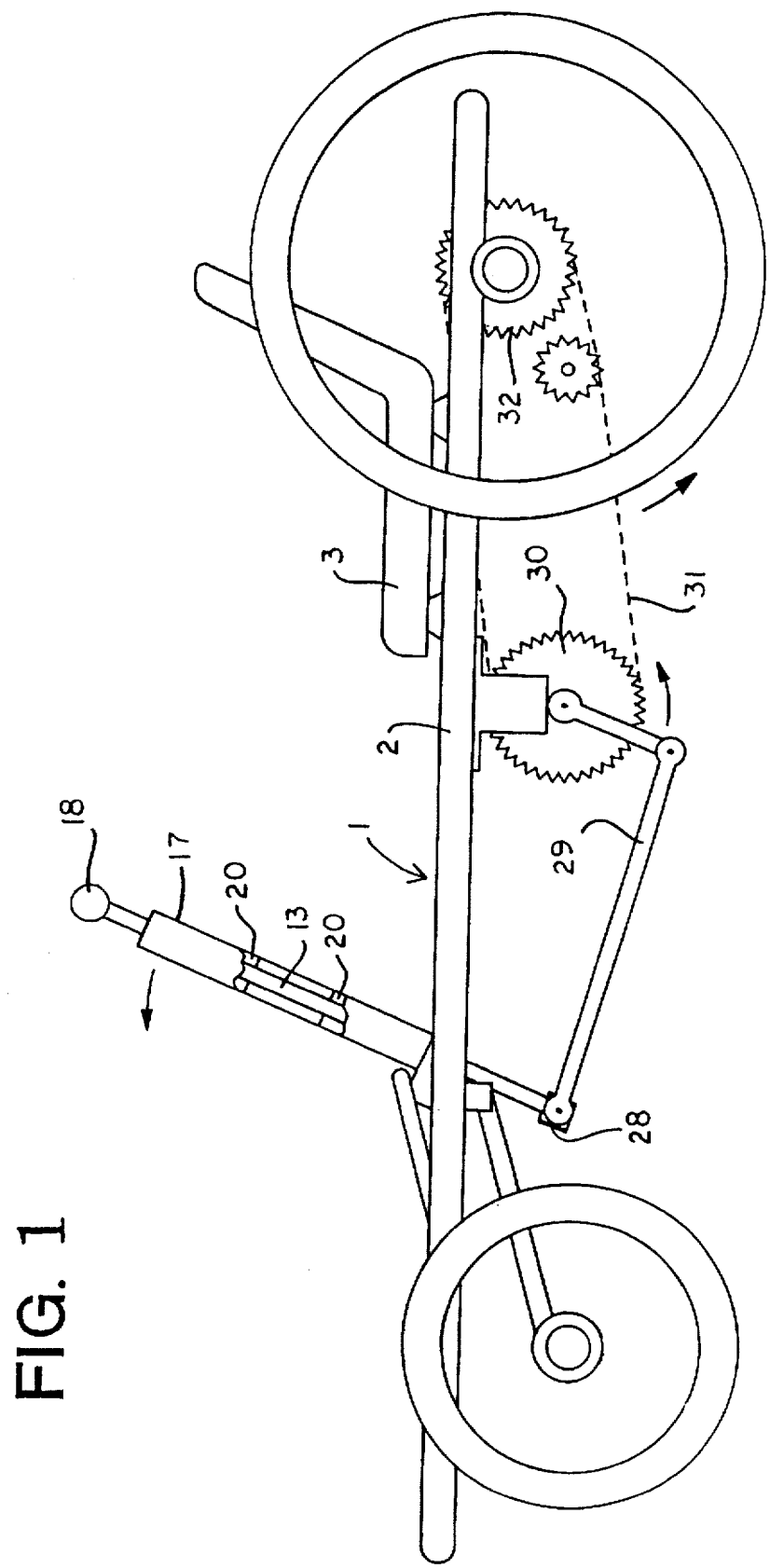
FIG. 1 is a side elevation view of the vehicle.
Figure 2:
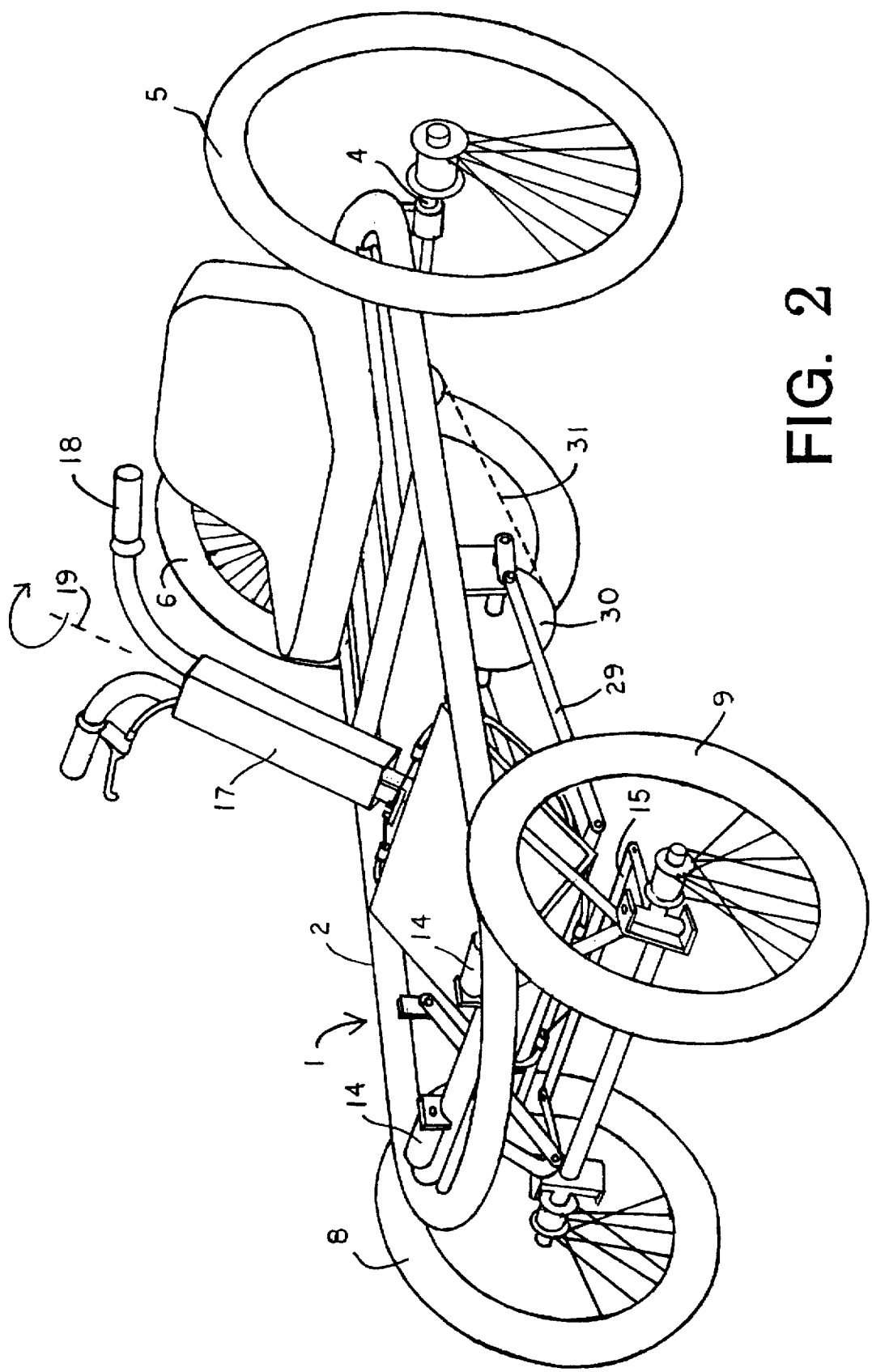
FIG. 2 is a perspective view of the vehicle.
Figure 3:
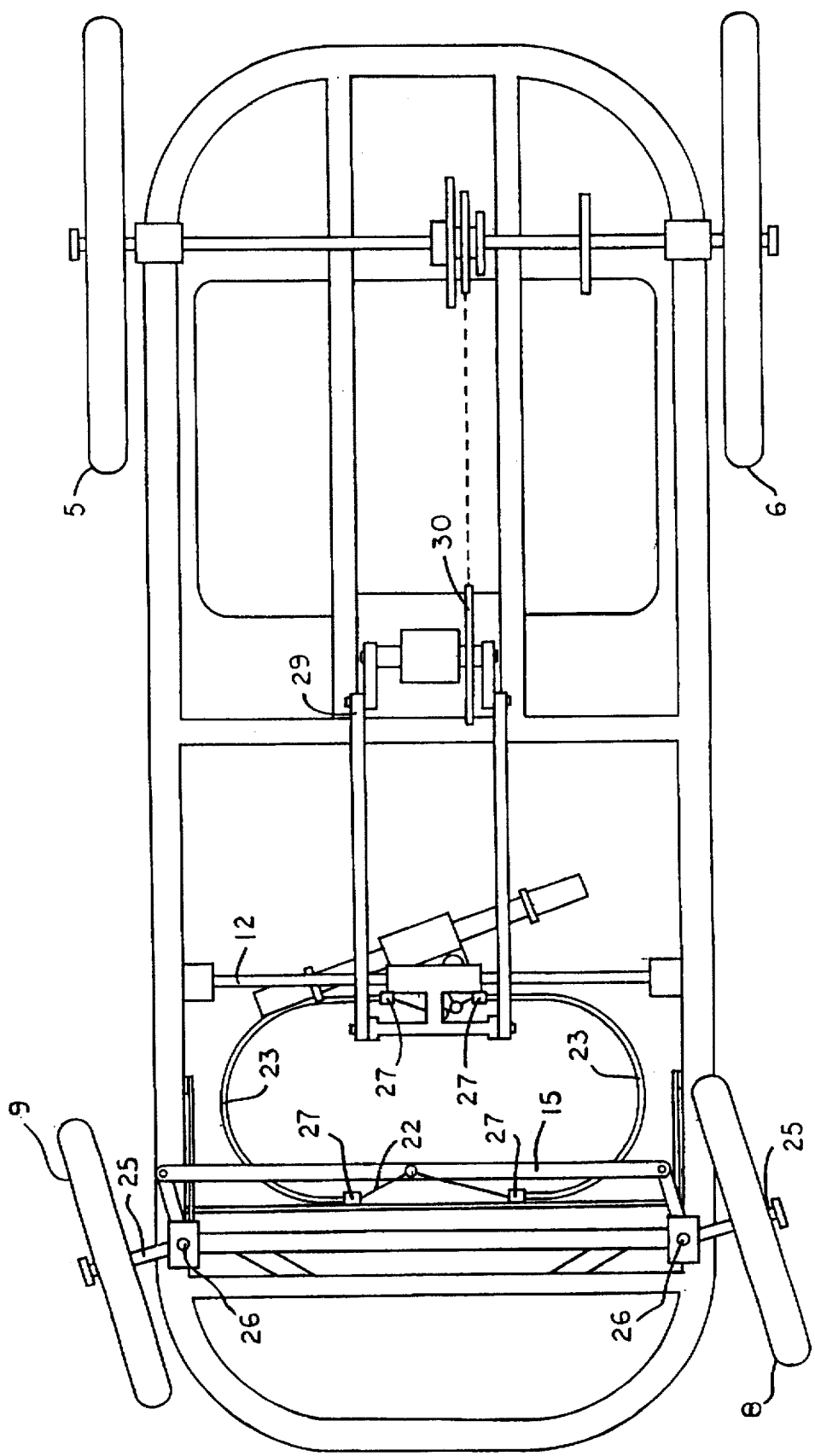
FIG. 3 is a bottom view of the vehicle.
Figure 4:
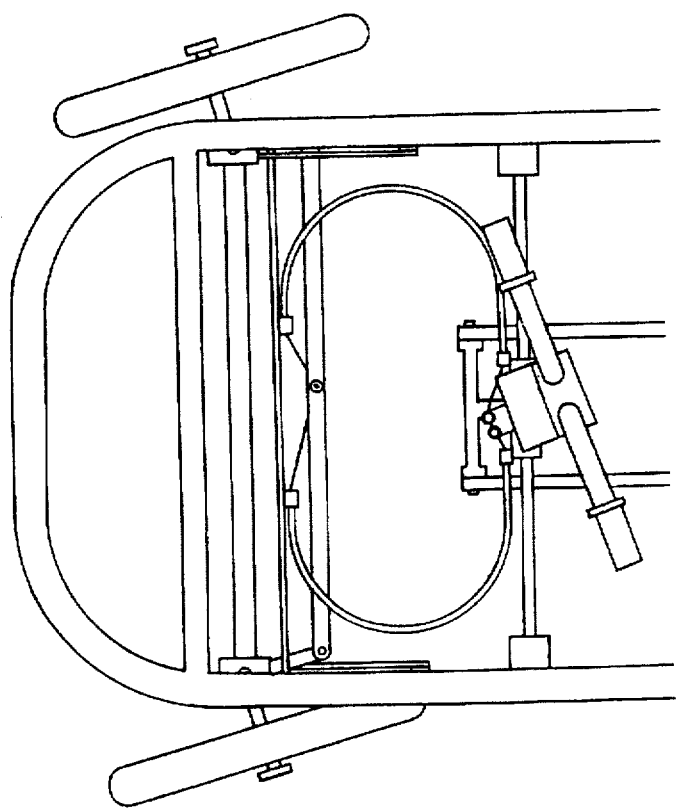
FIG. 4 is a partial top view of the vehicle.

Referring now to the drawing figures, the vehicle 1 comprises a rigid frame 2 supporting a seat 3 for the operator and stationary footrests 14.

The vehicle is propelled by moving the handlebar 18 in an oscillatory fore and aft motion.

It is steered by rotation of the handlebar 18 about a long axis 19. The handlebar 18 is affixed to handlebar element 17 which is rotatably mounted by bearings 20 on propulsion member 13 so as to be rotatable about the axis 19.

Propulsion member 13 is pivotally mounted to the frame by horizontal pivot bearings 16 so that the handlebar element 17 and propulsion member 13 may be oscillated in a fore and aft rowing motion to propel the vehicle forward.

The front wheels 8, 9 are mounted on individual axles 25 for free rotation about a horizontal axis. The axles 25 are pivotally mounted for rotation about vertical axes 26, and tied to a common steering bar 15 in a manner well known in the art and may also include well known caster and chamber adjustment well known in the art of steerable means which need not be further disclosed.

A closed loop push pull wire cable 22 connects the steering bar 15 to the handlebar element 17 so that rotation of the handlebar 18 about its long axis causes the front wheels to turn left or right. The cable 22 is held in place by sleeves 23 which are mounted at their forward ends to the frame at a cross member 11 and at their rear ends to the transverse support 12 for the propulsion member 13. At either of these ends, the mounting for the sleeve may be provided with adjusting means 27 for adjusting the length of sleeve supported to thereby pretension the wire cable. This provides a secure closed steering loop in which the pivot point is close enough to the horizontal axis of the propulsion member that steering and propulsion motions do not interact and the steering action is substantially free of slack.

At the free end of the propulsion member 13, a transverse bar 28 supports two pivotted crank mechanisms 29 which are connected to a drive sprocket 30 for converting oscillatory into rotary motion. The sprocket 30 drives a chain 31 coupled to a conventional chain derailer assembly 32 well known in the art for adjusting the mechanical advantage. The chain drive assembly 32 is coupled to the rear axle by an overrunning clutch 33 of the type well known in the bicycle art for coasting downhill. This provides free rotation of the rear axle 4 and the right wheel 6 affixed thereto in a first (forward) direction of rotation when the axle is rotating faster than the chain drive and not in the reverse direction of rotation, left rear wheel 5 rotates freely on the axle.

This arrangement prevents the dangerous forceful movement of the handlebar when coasting downhill.

Figure 5:
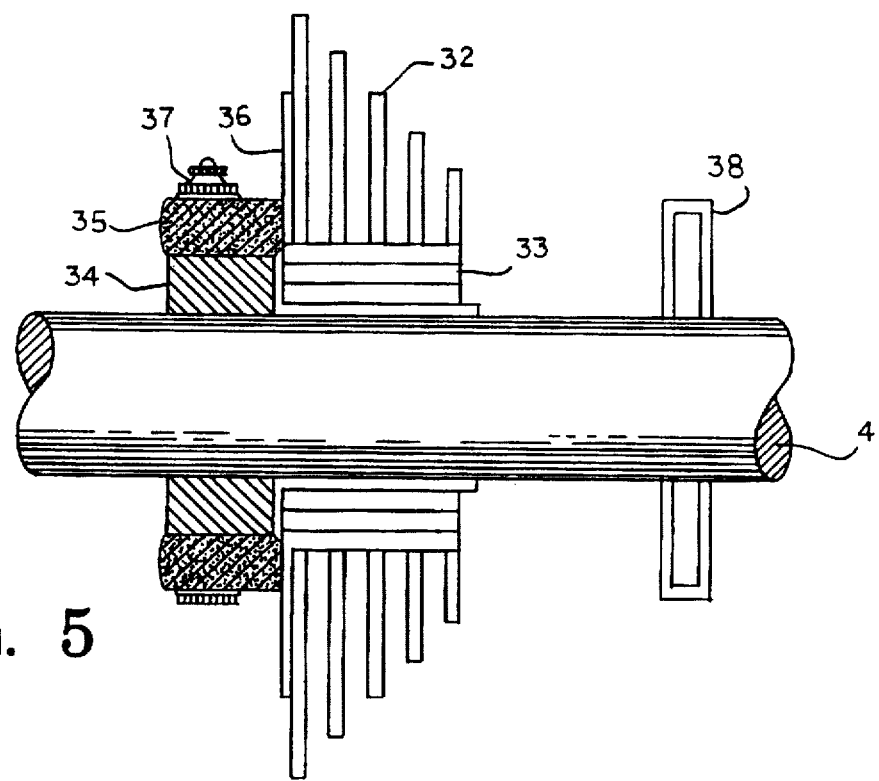
FIG. 5 is a diagrammatic detail of the clutch and drag mechanism on the rear axle.
Figure 6:
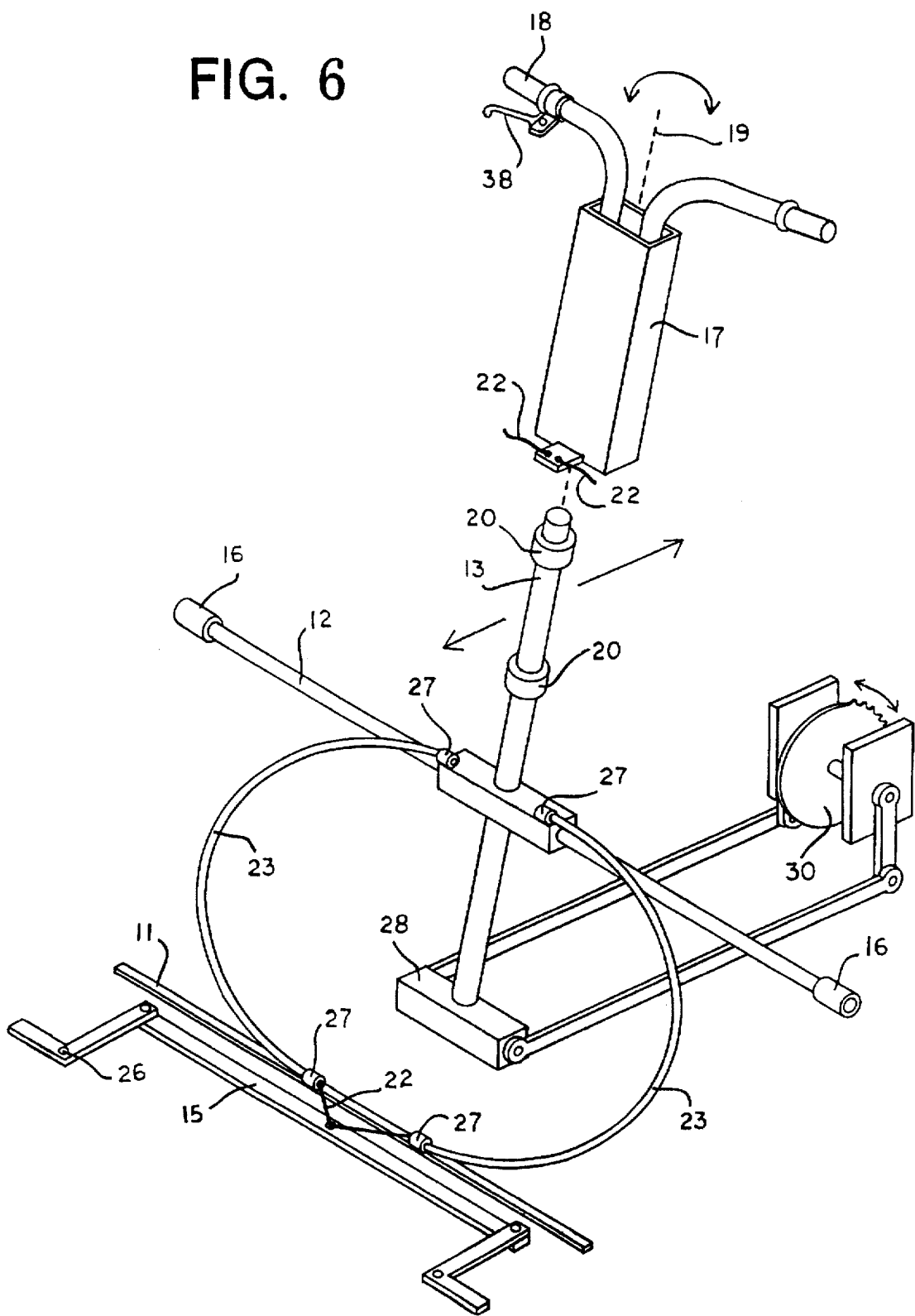
FIG. 6 is a perspective view of a portion of the steering and propulsion mechanism.

One of the well known problems encountered with crank arm drives is the failure at the dead center position. The vehicle overcomes this problem by an adjustable drag slip clutch connection between the chain drive and the rear axle. As best seen in FIG. 5, a collar 34 is affixed to the rear axle 4. A resilent sleeve 35 fits over the collar and against boss 36 on the chain drive and overrunning clutch assembly. An adjustable screw clamp 37 changes the frictional connection between the chain drive and the axle so that there is adjustable resistance to the free rotation. This enables the coasting wheels to gently urge the handlebars in an oscillatory motion to be picked up by the operator when resumption of forward driving is desired and avoiding the occasional dead center problem. When the vehicle is stopped at dead center, the rear wheels are so positioned relative to the seat that the user may reach the wheels with his/her hands and push past dead center, the drag causing the crank arm to be moved.

The hand brake 38 and other controls are conventional and need not be disclosed. The vehicle is especially useful for upper body exercising and for a person without functional legs.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention.

What is claimed is:

1. A vehicle comprising:

a frame;

a seat supported by the frame;

a rear axle rotatably supported on the frame; spaced apart left and right rear wheels mounted on the rear axle;

spaced apart left and right front wheels; steerable means supporting the front wheels on the frame to rotate relative to the frame about generally horizontal axes and to steer about generally vertical axes;

a column assembly having a long axis and means supporting the column assembly relative to the frame for oscillation about a horizontal pivot axis for vehicle propulsion and for rotation about the long axis for steering the front wheels;

coupling means operatively coupling the column assembly to the rear axle for powering at least one rear wheel, the coupling means spaced away from the horizontal pivot axis;

a closed loop push pull wire cable operatively coupling the steerable means to the column assembly such that rotation of the column assembly about the long axis causes steering motion of the front wheels, the steering motion being unaffected by the oscillatory fore and aft position of the column assembly;

the coupling means including an overrunning clutch mechanism enabling free rotation of the rear axle independent of the column assembly in a first direction of rotation and not in a second direction of rotation; and an adjustable drag mechanism interposed between the clutch mechanism and the rear axle for adjustably applying a resistance to the free rotation.

2. The vehicle according to claim 1, in which the coupling means comprises at least one crank mechanism.

3. The vehicle according to claim 2, in which the coupling means comprises a sprocket changing mechanism for adjusting gear ratios.

4. The vehicle according to claim 3, in which the rear wheels are so located relative to the seat that an operator sitting therein may comfortably grasp the rear wheels to move the coupling means past dead center.

5. The vehicle according to claim 4, in which the push pull wire cable is supported by a sleeve assembly, the sleeve assembly being connected to the frame by adjusting means for pretensioning the closed loop.

6. A vehicle comprising:

a frame;

a seat supported by the frame;

a rear axle rotatably supported on the frame; spaced apart left and right rear wheels mounted on the rear axle;

spaced apart left and right front wheels; steerable means supporting the front wheels on the frame to rotate relative to the frame about generally horizontal axes and to steer about generally vertical axes;

an elongate propulsion member having a long axis;

means supporting the propulsion member relative to the frame for oscillation about a horizontal pivot axis for vehicle propulsion by fore and aft motion of the propulsion member;

coupling means operatively coupling the propulsion member to the rear axle for converting translatory motion of the propulsion member to rotary motion of the rear axle, the coupling means being connected to the propulsion member spaced away from the horizontal pivot axis;

handlebar means rotatably mounted on the propulsion member for rotation about the long axis for steering of the front wheels by rotation and for propulsion by fore and aft oscillation, the handlebar means having a steering connector at a lower end thereof;

a closed loop push pull cable operatively connecting the steerable means to the steering connector such that rotation of the handlebar means about the long axis causes steering motion of the front wheels, the steering motion being unaffected by the fore and aft position of the handlebar means;

the coupling means comprising at least one crank arm, a sprocket and chain assembly, and an overrunning clutch assembly enabling free rotation of the rear axle independent of the column position in a first direction of rotation and not in a second direction of rotation; and an adjustable drag mechanism operatively interposed between the clutch assembly and the rear axle for adjustably applying resistance to the free rotation of the rear axle.

7. The vehicle according to claim 6, in which the coupling means further comprises a sprocket changing mechanism for adjusting mechanical advantage.

8. The vehicle according to claim 7, in which the push pull cable is supported by a sleeve assembly, the sleeve assembly being attached to the frame by adjusting means for pretensioning the closed loop.

9. The vehicle according to claim 8, in which the rear wheels are so located relative to the seat that an operator sitting therein may comfortably grasp the rear wheels to move the coupling means past dead center.

* * * * *